United States Patent [19]

Larson, Jr.

[11] Patent Number: 5,375,532

[45] Date of Patent: Dec. 27, 1994

[54] CONVERTIBLE RAILWAY-ROADWAY VEHICLE AND METHOD OF USE

[76] Inventor: Ernest J. Larson, Jr., 7408 W. Shore Dr., Edina, Minn. 55433

[21] Appl. No.: 54,906

[22] Filed: Apr. 29, 1993

Related U.S. Application Data

[63] Continuation-in-part of Ser. No. 887,759, May 26, 1992, Pat. No. 5,220,870.

[51] Int. Cl.⁵ .............................................. B61C 11/00
[52] U.S. Cl. ................................. 105/72.2; 105/26.05
[58] Field of Search ................ 105/215.2, 72.2, 26.05, 105/26.1, 34.1, 34.2, 72.1, 85, 215.1, 100, 120, 122, 123, 132.1

[56] References Cited

U.S. PATENT DOCUMENTS

| | | | |
|---|---|---|---|
| 1,306,051 | 6/1919 | Dutton | 105/72.2 |
| 1,670,907 | 5/1928 | Skooglun | 105/49 |
| 1,814,917 | 7/1931 | Hagman | 105/159 |
| 1,957,712 | 5/1934 | Gustafson | 105/109 |
| 2,721,522 | 10/1955 | Ames | 105/72.2 |
| 2,787,971 | 4/1957 | Obes | 105/215 |
| 2,915,020 | 12/1959 | Bleibtreu | 105/4 |
| 2,942,559 | 6/1960 | Langstroth | 105/72.2 |
| 2,965,046 | 12/1960 | Chambers | 105/215 |
| 2,992,621 | 7/1961 | Schoen | 105/4 |
| 3,207,085 | 9/1965 | Burr | 105/26 |
| 3,557,708 | 1/1971 | Bolte | 105/4 |
| 3,690,271 | 9/1972 | Hobbs | 105/199 R |
| 3,696,757 | 10/1972 | Newman et al. | 105/4 R |
| 3,926,128 | 12/1975 | Zappel | 105/26.05 |
| 4,111,451 | 9/1978 | Pinto | 280/408 |
| 4,365,820 | 12/1982 | Rush | 280/411 C |
| 4,380,198 | 4/1983 | White, Jr. | 105/26 R |
| 4,397,243 | 8/1983 | Hickman | 105/72.2 |
| 4,448,132 | 5/1984 | Beatty | 105/215.2 |
| 4,497,257 | 2/1985 | White, Jr. | 105/215 C |
| 4,534,297 | 8/1985 | Johnson, Sr. | 105/215 C |
| 4,547,107 | 10/1985 | Krause | 410/58 |
| 4,917,020 | 4/1990 | Wicks et al. | 105/4.3 |
| 4,938,151 | 7/1990 | Viens | 105/4.3 |
| 4,955,292 | 9/1990 | Cripe | 105/215.2 |
| 4,961,676 | 10/1990 | Gourdin | 105/215.2 |
| 5,009,169 | 4/1991 | Viens | 105/4.1 |
| 5,016,544 | 5/1991 | Woollum | 105/72.2 |
| 5,058,917 | 10/1991 | Richardson | 105/215.2 |
| 5,199,359 | 4/1993 | Bedard | 105/168 |

FOREIGN PATENT DOCUMENTS

| | | | |
|---|---|---|---|
| 3925344 | 2/1991 | Germany | 105/72.2 |
| 0081765 | 3/1990 | Japan | 105/72.2 |
| 0310567 | 5/1929 | United Kingdom | 105/26.05 |
| WO92/00213 | 1/1992 | WIPO | B61D 3/18 |

OTHER PUBLICATIONS

The Trailer-Railer Vehicle & System, Roger D. Sims, The American Society of Mechanical Engineers, Presented at Winter Annual Mtg., Nov. 27–Dec. 2, 1988, pp. 1–9.

(List continued on next page.)

Primary Examiner—Mark T. Le
Attorney, Agent, or Firm—Faegre & Benson

[57] ABSTRACT

A method for using an over-the-roadway tractor, a puller configured for interconnection to and powered by a tractor for driving the puller over a railway, and railway bogies, for hauling one or more convertible roadway-railway trailers over both a railway and roadway. The method includes configuring the trailer for railway travel and operating the tractor to remove the trailer from the roadway and position the trailer on the railway, driving the tractor onto the puller and connecting the tractor to the puller drive system, operating the tractor to connect the puller to the trailer and drive the trailer over the railway when the trailer is configured for railway travel and positioned on the railway, disconnecting the tractor from the puller drive system and driving the tractor off of the puller, configuring the trailer for roadway travel and operating the tractor to remove the trailer from the railway and position the trailer on the roadway, and operating the tractor to drive the trailer over the roadway when the trailer is configured for roadway travel and positioned on the roadway.

26 Claims, 3 Drawing Sheets

OTHER PUBLICATIONS

The Road/Rail Power Unit Advertisement, Brandt, no date.

The Bi-Modal RoadRailer, Andy Sperandeo, Model Railroader Magazine, Jul. 1982, no page No.

Holcomb, Kenneth Johnson, 1920–History, Description and Economic Analysis of Trailer–On–Flatcar (Piggyback) Transportation, Chapter III pp. 36–72.

Railway Age, Nov. 30, 1981–"TOFC/COFC: It's a growth market again", by Gus Welty, pp. 22–25.

Traffic Management–Sep. 1987–"Return of the Road Railer"–by James J. Callari, pp. 81, 83, 85.

Railway Gazette Int'l–Sep. 1987–"Italians join the international race"–p. 605.

American Shipper, Jan. 1992–"Five become one at Romar", by Joseph Bonney, p. 58.

Railway Age, Apr. 26, 1982–"What, why, how–and by whom", pp. 17–19, 21.

Railway Age, Jul. 26, 1982–"Berwick enters the intermodal derby", p. 14.

Railway Age, Oct. 25, 1982–"Itel and Thrall deliver test cars to Trailer Train", pp. 22–23.

Railway Age, Mar. 1984–"Tomorrow's TOFC cars?", pp. 55–56.

Railway Gazette, Mar. 1992–"Intermodal Wagons'–'–pp. 184–187, 189.

Railway Age–Mar. 1992–"Put Yourself on Track"–p. 71.

CONVERTIBLE RAILWAY-ROADWAY VEHICLE AND METHOD OF USE

REFERENCE TO CO-PENDING APPLICATION

This application is a continuation-in-part of the commonly owned Larson application Ser. No. 07/887,759 filed May 26, 1992 now U.S. Pat. No. 5,220,870 and entitled A Convertible Highway-Railway Hauling Vehicle.

BACKGROUND OF THE INVENTION

The present invention relates generally to bimodal hauling vehicles which can be converted for use on both railways and roadways, and to a method for using the vehicles. In particular, the present invention is a bimodal hauling vehicle and associated method of use which permit one operator to operate the vehicle on both a highway and railway, and to convert the vehicle between highway and railway operation at a grade crossing.

The idea of moving one kind of vehicle on another vehicle is not new in North America. Between 1843 and 1854, canal boats were hauled by cog railroad over mountains from one stream to another. During the 1850s and the 1860s, boats were used to haul supplies, horses and wagons of Westward bound pioneers on inland waterways. On festive occasions, Canadian railroads operated special picnic trains hauling passengers and sleighs that were mounted on flat cars. In the United States, the first railway-highway intermodal operations were termed "piggyback" operations. The early piggyback operations consisted mainly of trains hauling farmers wagons. The first piggyback train began operation in 1885 and hauled 16 wagons on eight flat cars. The distance travelled was 20 miles and the savings in time was substantial. As the service became more well known special cars were built that could haul four wagons each. Passenger service for the owners or drivers of the wagons was furnished in a separate car. The operation only lasted ten years, but it was the beginning of highway-railway intermodal travel in the United States.

The railroad faced two handicaps in competing with motor carriers. First, rail service did not offer the door-to-door pickup and delivery service provided by motor carriers, and second, freight in less than carload quantities needed better packaging for shipment by rail than by motor carrier. Piggyback service was intended to overcome these problems.

In 1926, the Chicago, North Shore and Milwaukee Railroads began hauling railroad-owned highway trailers on flat cars, providing the first modern piggyback service in the United States.

Between 1939 and 1951, the railroads' efforts to expand piggyback service were largely abandoned. The economic pressure on the railroads to increase traffic was greatly relieved by the freight shipments generated by World War II and by the pent-up demand for consumer goods immediately following the end of the war. When the backlog of orders was reduced, rail tonnage again began to decline. Before any action was taken toward increasing piggyback services, however, the Korean War increased the demand for service to such an extent that railroads did not feel it was necessary to explore avenues which might yield additional freight tonnage. When rail freight tonnage began to decline in 1952, and the railroads again became interested in methods of increasing tonnage, the search lead them to a reappraisal of piggyback service. During the 1950s, piggyback operations expanded rapidly and by the end of 1959, most of the principal railroads in the United States were providing piggyback service.

Over the years, many methods and designs of piggyback service have been developed. Each, however, is a variation of one of two primary methods. One of these methods involves hauling the complete trailer. The other method involves hauling only the trailer body. The Clejan System is representative of a technique for hauling the complete trailer, while the New York Central Railroad's Flexi-Van Service is representative of a technique for hauling only the trailer body. The Clejan System uses trailers outfitted with special railroad wheel dollies that ride on rails built into specially fitted flatbed cars. The dollies can be either permanently attached to the trailer or detachably mounted with a pin mechanism. Detachable dollies are put on the trailer using a hydraulic jack to lift the dolly up to the trailer bottom. A pin is used to connect the dolly to the trailer. No tools were needed to connect the dolly to the trailer. The trailer's rear roadway wheels are not detachable. Front dolly wheels are attached by positioning the wheels under the landing gear and securing them with a pin.

The New York Central Flexi-Van system uses trailers outfitted with detachable Sliding rear roadway wheel assemblies. To detach a roadway wheel assembly, the trailer is backed up to a flatbed car that has a hydraulic turntable built into it. The roadway wheel assembly is released and slid forward before the turntable is hydraulically raised. The turntable mechanism lifts the trailer off of the roadway wheels. The trailer is hauled on a flatbed car.

The search for an easier and less expensive way of carrying more tonnage led to an innovation in intermodal transportation. In the late 1950s, the Chesapeake and Ohio Railroad developed the Rail Van, a bimodal trailer with separate highway and railway axles. The Rail Van was designed to ride directly on the highway or the railway. In the late 1970s, a new trailer was designed with a single rail axle and tandem highway axles. This trailer, designed and built for am company called Road Railer, has a set of non-removable railway wheels located between tandem highway axles. To run on the road, the railway wheels are retracted above the highway wheels. Conversely, to run on rails, the railway wheels are extended below the roadway wheels. One major disadvantage of this system is that the railway wheels are heavy and the weight must be carried at all times. This decreases gas mileage and increases the cost of hauling tonnage over the highway.

The Ferrosud, Carro Bimodale System is another bimodal trailer design. It uses a two-axle railway bogie fitted with a locking device to ensure that the bogie and van trailer are correctly joined. On arrival at the roadway-railway transfer site, the pneumatic suspension of the trailer is used to lift the van body to a height above the rail bogie. The waiting bogie is moved under the van, the van is lowered into position, and the railway breaking system is connected. The roadway wheels end up above the railroad track. One two-axle bogie is used between two trailers with the back of one trailer mounted on one-half of the bogie and the front of another trailer mounted on the other half of the bogie. Although this system includes removable bogies, the two-axle bogie used in the Carro Bimodale System is heavy and cannot be securely attached to the posterior end of the trailer.

The Viens U.S. Pat. No. 5,009,169 discloses a rail bogie including a truck having a platform with railway wheels underneath, a fifth wheel and a hooking lock. A self-actuating lift assembly on the bogie is used to raise and hold a tractor on the back of a semi-trailer. Two different bogie designs are used to support and carry a semi-trailer on the railroad track. Neither bogie, however, can be securely attached to the trailer and lifted from the track.

The Wicks et al. U.S. Pat. No. 4,917,020 discloses a transition vehicle with roadway wheels and railway wheels. The transition vehicle contains a clamping mechanism to grasp the sidewalls of a trailer being carried. The roadway wheels are raised during rail use by an air spring suspension system. The transition vehicle can be attached to a road vehicle, another rail car or a train engine. The transition vehicle, however, cannot be securely attached to the trailer and the trailer cannot lift the transition vehicle to a different track location. Again, this reduces flexibility. The transition vehicle is also used on the anterior portion of the hauling vehicle, between the moving vehicle and the hauling vehicle.

The Beatty U.S. Pat. No. 4,448,132 discloses a convertible railway-highway vehicle containing railway wheels and highway wheels. The vehicle uses a number of axles for highway wheels to maximize the load it can carry. The highway wheels are on a liftable axle assembly with a locking mechanism. An airbag spring assembly is used to lift the axle assembly. However, the railway wheels cannot be disconnected during highway use. This adds additional weight during highway use and increases the cost for hauling over the highway.

In many areas such as rural locations and developing countries, railways are a more effective means of transportation than roadways. Unfortunately, the railway-highway vehicles described above are relatively complicated to operate. Railways therefore tend to be an underutilized mode of transportation for smaller organizations or individuals such as farmers that are not hauling large quantities of goods typically required for the efficient operation of these known bimodal systems.

It is therefore evident that there is a continuing need for improved convertible railway-roadway vehicles. In particular, there is a need for vehicles of this type that can be conveniently converted between railway and highway travel operating modes at grade crossings. Vehicles of this type would be especially useful if they can be converted between railway and highway operating modes by one person, and efficiently operated by one person on both the railway and highway. To be commercially viable, any such vehicle must of course be capable of being efficiently manufactured.

SUMMARY OF THE INVENTION

The present invention is a puller for use in conjunction with a conventional over-the-road tractor for hauling convertible roadway-highway trailers on a railway, and a method for using the puller in conjunction with the tractor and trailers. One person can conveniently use the tractor and puller to convert the trailers between highway and railway operating modes at any grade crossing, and to haul the trailers on both the highway and railway. No special ramps are required, and the removable railway bogies can be stored at any convenient location.

In one embodiment the puller includes a platform for receiving and supporting a tractor, railway bogies mounted to the platform for supporting the platform for railway travel, and a drive system. The railway bogies include at least one driven axel. The drive system is coupled to the driven wheel and configured for interconnection to and powered by a tractor.

In other embodiments the puller includes a retractable ramp mounted to the platform to enable a tractor to be driven onto and off of the platform. The drive system includes an electric motor coupled to the driven wheel, and a generator configured to be driven by a tractor for powering the electric motor. An auxiliary engine can also be mounted to the platform and connected to drive the generator.

The method by which the puller is used in conjunction with a tractor and convertible roadway-railway trailers to haul the trailers includes configuring the trailer for railway travel and operating the tractor to remove the trailer from the roadway and position the trailer on the railway, driving the tractor onto the puller and connecting the tractor to the puller drive system, and operating the tractor to connect the puller to the trailer and drive the trailer over the railway when the trailer is positioned on the railway and configured for railway travel. The method also includes disconnecting the tractor from the puller drive system and driving the tractor off of the puller, configuring the trailer for roadway travel and operating the tractor to remove the trailer from the railway and position the trailer on the roadway. The trailer is connected to the tractor and driven over the roadway when the trailer is positioned on the roadway and configured for roadway travel.

In one embodiment the method is used in conjunction with a convertible roadway-railway trailer having retractable roadway wheels. Configuring the trailer for railway travel and operating the tractor to remove the trailer from the roadway and position the trailer on the railway includes operating the tractor while the trailer is on the roadway and the railway bogies are off the railway to position the trailer over the railway bogies, retracting the roadway wheels to lower the trailer onto the railway bogies, connecting the railway bogies to the trailer, extending the roadway wheels to lift the railway bogeys, operating the tractor to position the trailer and railway bogies over the railway, and retracting the roadway wheels to lower the railway bogies and trailer onto the railway. Similarly, configuring the trailer for roadway travel and operating the tractor to remove the trailer from the railway and position the trailer on the roadway includes extending the roadway wheels to raise the railway bogies and trailer from the railway, operating the tractor to remove the trailer and railway bogies from the railway and position the trailer on the roadway, retracting the roadway wheels to lower the railway bogies, disconnecting the railway bogies from the trailer, and extending the roadway wheels to lift the trailer off of the railway bogies.

DESCRIPTION OF THE PREFERRED EMBODIMENT

A bimodal hauling trailer or vehicle 2 which can be used in conjunction with the puller and method of the present invention is illustrated generally in FIGS. 1-7. Complete descriptions of the puller and method can be found below in subsequent portions of this specification.

Vehicle 2 is convertible between highway (roadway) and railway use and includes a main body 4, a front or anterior end 6, a rear or posterior end 8, a bottom 7 and a highway wheel assembly IC slidably attached to the bottom 7 at the posterior end 8. At the anterior end 6 is a first connecting means 12 and second connecting means 14. The first connecting means 12 is preferably a fifth wheel 13 attached to the bottom 7 and used for connecting the hauling vehicle 2 to a highway moving means such as a semi-truck or tractor 60 such as that illustrated in FIG. 10. The second connecting means 14 is preferably a vertical steel pin 15 on a steel hitch 11. The steel hitch 11 and pin 15 extend attachably in front of the anterior end 6 at the bottom 7 with the steel hitch 11 attached to the bottom 7. The pin 15 is made to be easily inserted into a corresponding hole 17 in a steel hitch 16. Steel hitch 16 is located on the posterior end of a puller of the type shown FIGS. 8-10 and described below, or on the posterior end 8 of a hauling vehicle 2. The steel hitch 16 is slidably attached to the bottom 7 at the posterior end 8 of the hauling vehicle main body 4. The hitch 16 is slid underneath the main body 4 during highway use. During railway use, the hole 17 in the steel hitch 16 is extended past the posterior end 8 for connecting to the pin 15 of a second hauling vehicle 2. This allows a train of hauling vehicles to be connected together, one after the other. The hauling vehicle 2 also has a retractable pair of dolly wheels 5 located on the bottom 7 at the anterior end 6 of the main body 4. These wheels are used for supporting the hauling vehicle 2 when not in use. The dolly wheels 5 are held in place with a pin and hole combination 3.

Figure 7:
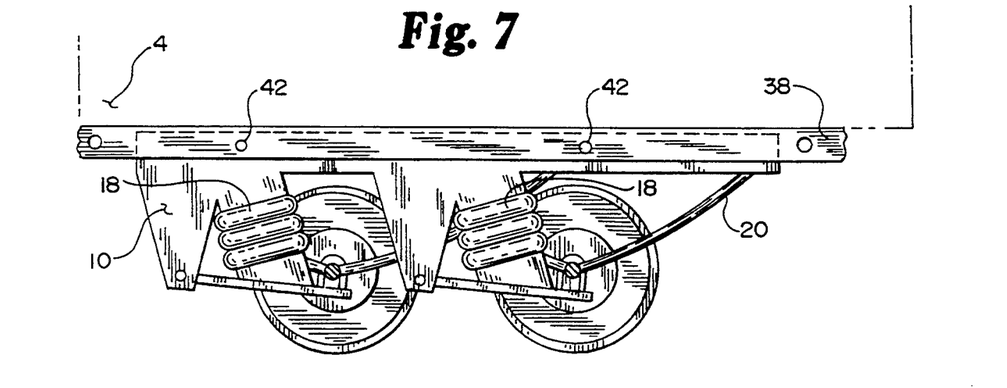
FIG. 7 is an exploded side view of the trailer shown in FIG. 1 with the slidable highway wheel assembly, the lifting means, the retracting means, and the undercarriage rail that the highway wheel assembly slides on positioned underneath the trailer.

As shown in FIG. 7, the slidably attached highway wheel assembly 10 has at least one axle, preferably two, a locking means 42, a lifting means 18 and a retracting means 20. The locking means 42 is a pair of pin and hole combinations located on each side of the hauling vehicle 2. The holes are in both the slidably attached highway wheel assembly 10 and an undercarriage rail 38. The undercarriage rail 38 is permanently attached to the bottom 7 of the hauling vehicle 2 and runs from the posterior end 8 longitudinally toward the anterior end 6 of the main body 4, ending in the middle of main body 4. To lock and unlock the slidable highway-wheel assembly 10, pins are inserted or removed from the holes in the highway wheel assembly 10 and undercarriage rail 38 when the holes are in line with each other. When the pins are removed, the highway wheel assembly 10 slides on the undercarriage rail 38, thus allowing the highway wheel assembly 10 to be repositioned beneath the main body 4 of the hauling vehicle 2. The extending or lifting means 18 is preferably an air bag assembly and the retracting means 20 is preferably leaf springs. Both the extending or lifting means 18 and the retracting means 20 are attached to the highway wheel assembly 10 and slide with the highway wheel assembly 10 when it is moved back and forth.

Figure 1:
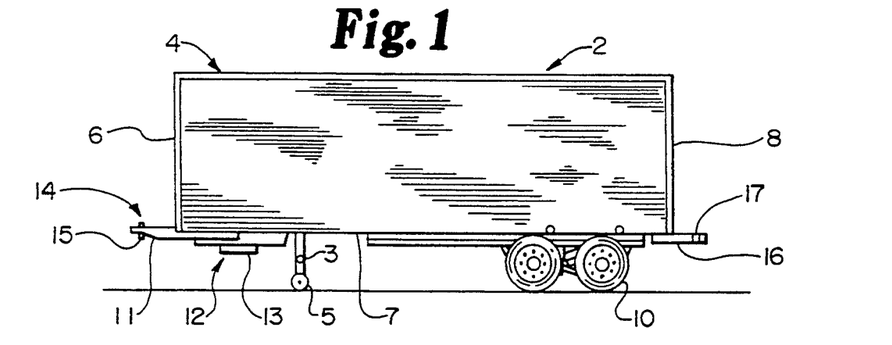
FIG. 1 is a side view of a convertible railway-roadway trailer which can be used in conjunction with the puller and method of the present invention, configured in the roadway mode of operation with the highway wheel assembly located at the posterior end.
Figure 2:
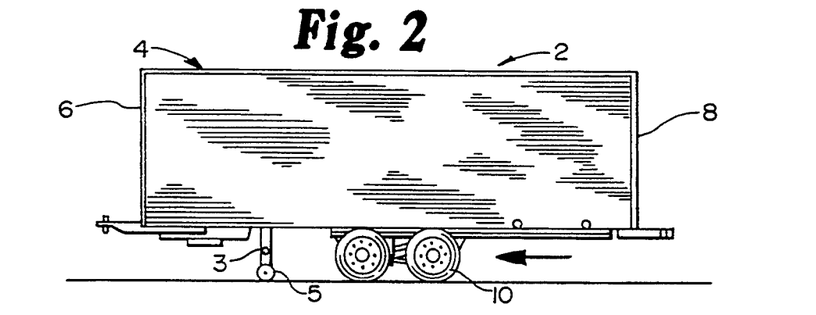
FIG. 2 is a side view of the trailer shown in FIG. 1 with the highway wheel assembly positioned at the middle of the main body of the trailer.
Figure 10:
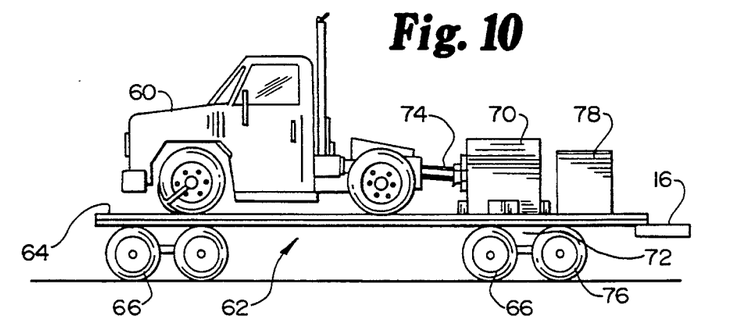
FIG. 10 is a side view of the puller shown in FIG. 8 with a tractor on the puller and the ramp retracted.

As shown in FIG. 1, the highway wheel assembly 10 is equipped with conventional air brakes which are located generally on the bottom 7 at the posterior end 8 of the hauling vehicle 2. During highway use the highway wheel assembly 10 is locked in position at the posterior end 8 with the locking means 42. To convert the hauling vehicle 2 into a railway vehicle, the locking means 42 is unlocked, a tractor 60 such as that shown in FIG. 10 is engaged or connected to the hauling vehicle, the air brakes are applied, and the tractor is operated to push or slide the hauling vehicle main body 4 longitudinally in the direction of the posterior end 8. This action slides the highway wheel assembly 10 forward underneath the main body 4. As shown in FIG. 2, the result of sliding the main body 4 in the direction of the posterior end 8 is the highway wheel assembly 10 being located in the middle of the main body 4. The highway wheel assembly 10 is then locked in place with the locking means 42.

Figure 3:
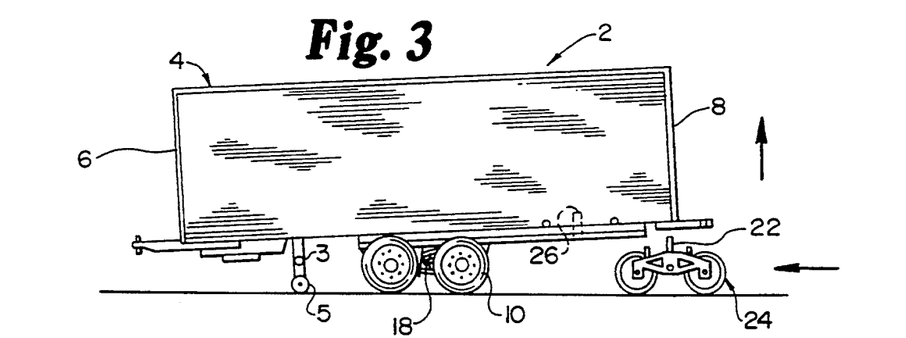
FIG. 3 is a side view of the trailer shown in FIG. 1 when the lifting means of the highway wheel assembly is inflated and the railway wheel bogie is positioned underneath the posterior end of the trailer.
Figure 5:
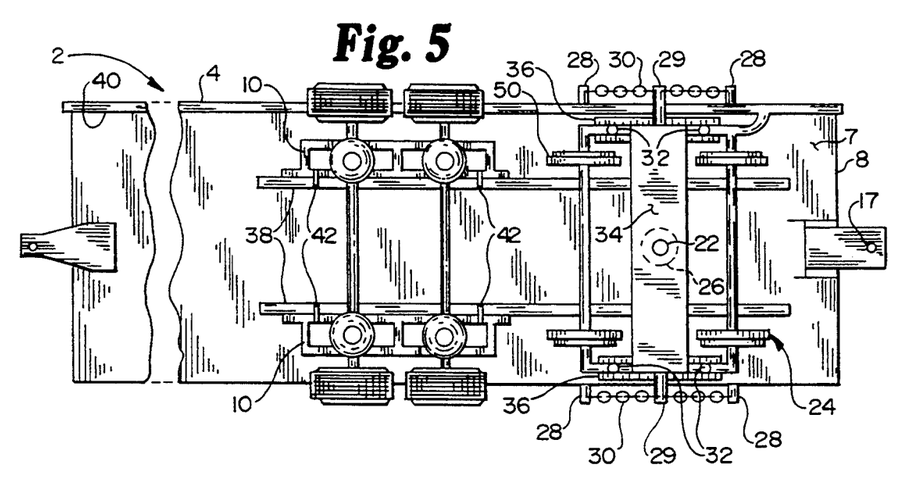
FIG. 5 is a bottom view of the trailer shown in FIG. 1, configured in the railway mode of operation with the highway wheel assembly positioned in the middle of the trailer and the railway wheel bogie securely attached to the posterior end of the trailer.

With the highway wheel assembly 10 locked in position in the middle of the main body 4, the air bag assembly 18 is inflated to lift the posterior end 8 of the hauling vehicle 2 to a height greater than that of the railway wheel bogies 24 to which the vehicle is to be mounted. As shown in FIGS. 3 and 5, a socket 26 is located underneath the main body 4 at the posterior end 8. The tractor 60 is then operated to position the hauling vehicle 2 in such a manner that the main shaft 22 of the railway wheel bogie 24 is located below the socket 26. The air bag assembly 18 is deflated to retract wheel assembly 10 and lower vehicle 2 until the main body 4 comes to rest on the railway bogie 24. This lowers the socket 26 of the posterior end 8 over the main shaft 22 of the railway wheel assembly 24, removably inserting the shaft 22 into the socket 26.

Figure 4:
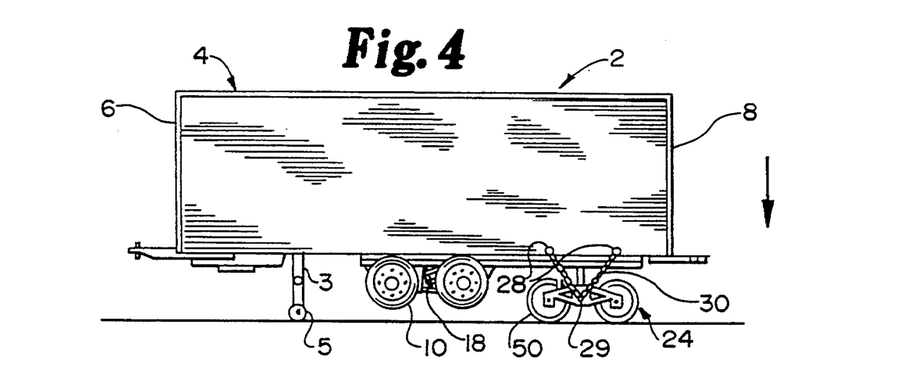
FIG. 4 is a side view of the trailer shown in FIG. 1, configured in the railway mode of operation with the highway wheel assembly retracted and the railway wheel bogie securely attached to the trailer.
Figure 6:
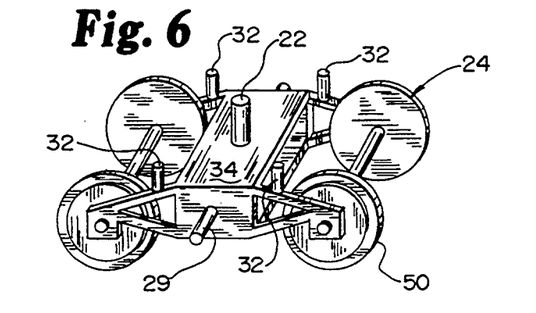
FIG. 6 is a side view of the railway wheel bogie of the trailer shown in FIG. 1.

As shown in, FIGS. 4, 5 and 6, the railway wheel bogie 24 includes a conventional electro-mechanical braking system, a main shaft 22, a frame 34, wheels 50, sway reducing bars 32 and permanently attached pins 29. The main shaft 22 removably fits into the socket 26 located at the posterior end 8 of the hauling vehicle 2.

The railway wheel bogie 24 is securely attached to the main body 4 using the pins 29 permanently attached to the railway bogie 24, pins 28 permanently attached to the main body 4 and chains 30. Two pins 28 are permanently attached to each side of the main body 4 and one pin 29 is permanently attached to each side of the railway wheel bogie 24. A chain 30 is secured on each side of the hauling vehicle 2 to the pins 28 and 29, one chain 30 for each side. This arrangement securely but removably fastens the railway wheel bogie 24 to the hauling vehicle 2. Inflating the air bags 18 allows the hauling vehicle 2, with railway wheel bogie 24 attached, to be relocated to a desired track through use of tractor 60. The sway reducing bars 32 on the railway wheel bogie 24 hit against the sway reducing pads 36 permanently attached to the bottom 7 of the hauling vehicle 2. This reduces the sway of the hauling vehicle 2 when used for railway travel. Two sway reducing bars 32 and one sway reducing pad 36 are located on each side of the hauling vehicle 2. The sway reducing pads 36 are located on the outside of the undercarriage rail 38. The electro-mechanical brakes of the railway wheel bogies are connected to a wiring harness 40 that runs the length of the hauling vehicle 2, connecting one hauling vehicle 2 to another and to puller 62. Although tandem axle railway wheel bogies 24 are shown in FIGS. 3–6, single axle railway wheel bogies (not shown) can be used as well.

Figure 11:
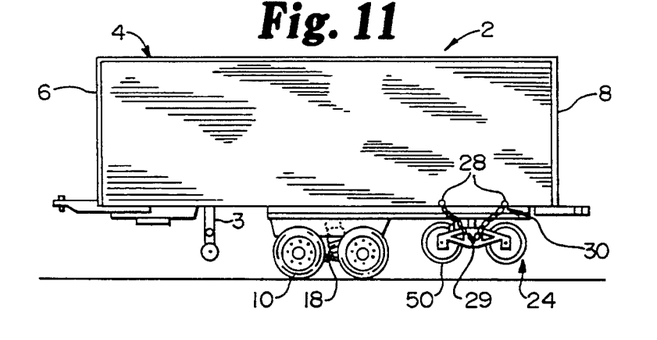
FIG. 11 is a side view of the trailer shown in FIG. 1 when the railway wheel bogie is attached to the trailer and the highway wheel assembly is inflated to lift the railway bogie off the track.

The above-described procedure for mounting railway wheel bogie 24 to hauling vehicle 2 when configuring the vehicle for railway operation can be performed with the railway bogie located on the railway over which the vehicle is to travel. Alternatively, this procedure can be performed while the railway wheel bogie 24 is positioned at a storage location, such as a ditch or other convenient location, away from the railway. After the hauling vehicle 2 is mounted to a railway bogie 24 while the railway bogie is at a storage location, airbag assembly 18 is inflated to extend highway wheel assembly 10 and raise the railway wheel bogie off of the ground or railway on which it is stored. FIG. 11 illustrates a hauling vehicle 2 with railway wheel bogie 24 attached and highway wheel assembly 10 extended to lift the bogie off the ground. Tractor 60 is then operated to move the hauling vehicle 2 to the railway, and, at a grade crossing, to position the hauling vehicle and railway wheel bogie over the railway. Airbag assembly 18 is then deflated to retract the highway wheel assembly 10 and lower the hauling vehicle 2 and railway wheel bogie 24 onto the railway. Tractor 60 can then be disconnected from the hauling vehicle 2 and driven away.

The procedure for mounting railway wheel bogie 24 to vehicle 2 can also be performed in two steps. With the highway wheel assembly 10 in its extended position the posterior end 8 of hauling vehicle 2 can be positioned by means of tractor 60 generally over railway wheel bogie 24. In particular, hauling vehicle 2 need not be positioned to such a high degree of accuracy that socket 26 is located directly over main shaft 22 of railway wheel bogie 24. Highway wheel assembly 10 is then retracted somewhat to lower posterior end 8 of hauling vehicle 2 adjacent to railway wheel bogie 24, and chains 30 attached to pins 28 and 29. Railway wheel bogie 24 is thereby secured to hauling vehicle 2 for transportation to the railway. Shaft 22 of railway wheel bogie 24 need not be positioned within socket 26 for this typically short distance transportation. After railway wheel bogies 24 are properly positioned on the railway, chains 30 can be removed and the position of hauling vehicle 2 adjusted with respect to the railway wheel bogies to position shaft 22 in socket 26. The chains 30 are then reattached to securely mount the railway wheel bogie 24 to hauling vehicle 2. An advantage of this two-step procedure is that it alleviates the need for the operator to precisely align socket 26 over shaft 22, which might otherwise be more difficult when the railway wheel bogies are stored at a sloping or other off-track location.

As shown in FIG. 4, when the railway wheel bogie 24 has been positioned on the desired track, the airbag assembly 18 is fully deflated and the highway wheel assembly 10 retracted to a position above the bottom of the railway wheels 50. In the embodiment shown in FIG. 7, the retracting means 20 is a set of leaf springs attached to the highway wheel assembly 10. The leaf springs 20 pull the highway wheel assembly 10 up to the main body 4 and out of the way for railway travel.

To convert the hauling vehicle 2 from railway travel to highway travel, the airbag assembly 18 is inflated to extend the highway wheel assembly 10 and raise the railway wheel bogie 24 off the railway. The tractor 60 is then operated to remove the hauling vehicle 2 from the railway at a grade crossing, and to move the vehicle to a track or other storage location at which the railway wheel bogie 24 is to be stored. The railway wheel bogie 24 can, for example, be conveniently stored in a ditch adjacent the grade crossing at which the hauling vehicle 2 is removed from the railway. The railway wheel bogie 24 is positioned over the storage track and the airbag assembly 18 deflated to retract wheel assembly 10 and lower the railway wheel bogie onto the track. Chains 30 connecting the main body 4 and railway wheel bogie 24 are then removed from the pins 28 and 29. The airbag assembly 18 is then inflated to extend highway wheel assembly 10 and raise the posterior end 8 of the hauling vehicle 2 above the railway wheel bogie 24, so the main shaft 22 slides out of the socket 26. The hauling vehicle 2 is moved away from the railway wheel bogie 24 through operation of the tractor 60, and the airbag assembly 18 deflated to position the hauling vehicle at a level appropriate for highway travel.

After hauling vehicle 2 is removed from railway wheel bogies 24, the locking means 42 holding the highway wheel assembly 10 is unlocked and the air brakes of the highway wheel assembly set. Tractor 60 is then operated to pull the main body 4 forward. This action moves the highway wheel assembly 10 to the posterior end 8. The highway wheel assembly 10 is then locked into place with the locking means 42, and the air brakes released. With hauling vehicle 2 configured for highway travel in this manner, tractor 60 can be used to pull the hauling vehicle over the roadway.

Figure 8:
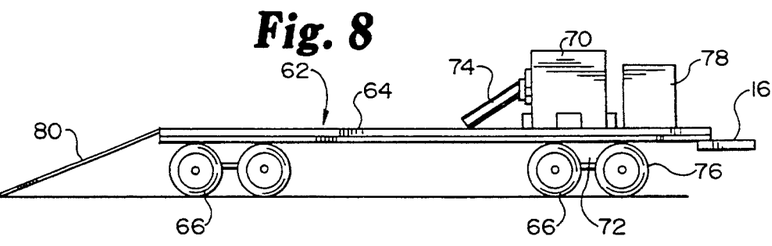
FIG. 8 is a side view of a puller in accordance with the present invention with the ramp extended.
Figure 9:
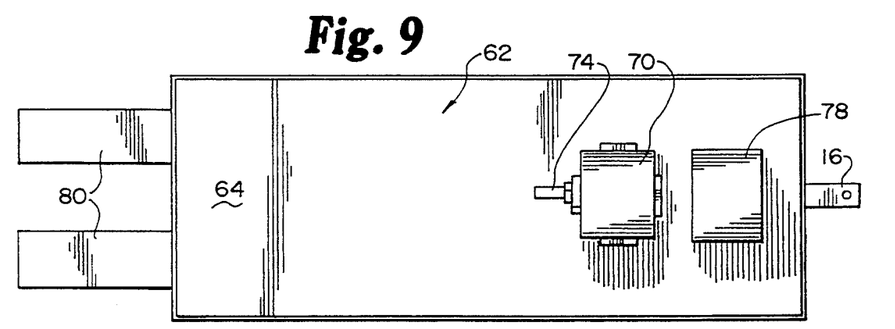
FIG. 9 is a top view of the puller shown in FIG. 8.

A puller 62 which can be used in conjunction with tractor 60 to pull convertible railway-highway vehicles such as hauling vehicle 2 over the railway is illustrated generally in FIGS. 8–10. As shown, puller 62 includes a platform 64 supported for over-the-railway travel by railway bogies 66. A drive system 68 is mounted on the rear of platform 64 in the embodiment shown and includes a dynamo or generator 70 coupled to drive motor 72. Generator 70 includes a drive shaft 74 configured to be mounted to the power take off (PTO) of tractor 60. Motor 72 is coupled to a driven wheel such as wheel 76 of the bogie 66 on the rear of puller 62. An auxiliary diesel or other engine 78 can also be mounted to platform 64 and Used to drive generator 70. Although not shown, other embodiments of puller 62 can include an enclosure with sides and a windshield for surrounding the tractor 60 after the tractor has been driven onto the platform 64.

Puller 62 can also include ramps 80 for loading and unloading tractor 60 over the front of platform 64. Ramps 80 can be pivotally or slidably mounted to platform 64 for ease of extension and retraction. In other embodiments (not shown), the ramp is a structure fixed to the ground at the end of a railway siding, rather than part of the puller.

Puller 62 is used by an operator to pull one or more vehicles such as 2 over the railway after the vehicles have been configured for railway travel and positioned on the railway in the manner described above. With ramps 80 extended, an operator will back tractor 60 up the ramps and onto platform 64 as shown in FIG. 10. The operator will then connect the drive shaft 74 to the lower off of tractor 60, and retract ramps 80. With the parking brake (not separately shown) of tractor 60 set, the operator can use the power from tractor 60 to drive generator 70 and thereby control the movement of puller 62. When operated in this manner puller 62 can be connected to a hauling vehicle 2 by means of hitch 16, and used to interconnect additional hauling vehicles to the vehicle attached to the puller. Once all the hauling vehicles 2 are connected to puller 62, and all the air brakes of the hauling vehicles are interconnected to one another and to tractor 60, the puller can be operated to pull the vehicles to their desired location. Alternatively, puller 62 can be powered by engine 78.

After vehicles 2 have been driven to their destination and disconnected from puller 62, ramps 80 are extended and drive shale 74 disconnected from the power take off of tractor 60. Tractor 60 can them be driven off of puller 62 and operated in the manner described above to remove the hauling vehicles 2 from the railway, configure the hauling vehicles for roadway travel, and pull the vehicles over the roadway.

The present invention offers considerable advantages over prior art bimodal systems. Both the hauling vehicles and the puller are relatively uncomplicated vehicles that can be efficiently manufactured and conveniently operated. These vehicles also enable on operator using a conventional tractor to haul the vehicles over both railways and roadways, and to conveniently configure the hauling vehicles for both railway and roadway operation. Most importantly, these operations can all be performed by one person. Having the capability to independently transport the hauling vehicles between two locations by means of both railway and roadway is of considerable value in many circumstances, especially in rural areas where roadway systems are poor. Since the puller is powered by the tractor, there is no need for dedicated pullers requiring more complicated and therefore expensive drive systems. The relatively light weight puller (with respect to the weight of conventional locomotives) and the braking system alleviates compression forces on the hauling vehicles during railway travel.

Although the present invention has been described with reference to preferred embodiments, those skilled in the art will recognize that changes can be made in form and detail without departing from the spirit and scope of the invention.

What is claimed is:

1. A puller for use in conjunction with an over-the-road tractor for hauling convertible roadway-railway trailers on a railway, including:
   a platform for receiving and supporting a tractor;
   railway bogies including at least one driven wheel and mounted to the platform, for supporting the platform for railway travel; and
   a drive system coupled to the driven wheel and configured for interconnection to and powered by a power take off of a tractor, for driving the puller over the railway, wherein the drive system includes:
   a motor coupled to the driven wheel; and
   a generator configured to be driven by a power take off of a tractor, for powering the motor.

2. The puller of claim 1 and further including a retractable ramp mounted to the puller, for enabling a tractor to be driven onto and off the platform.

3. The puller of claim 1 and further including an auxiliary engine mounted to the platform for driving the generator.

4. A method for using a puller characterized by claim 1 and a tractor to haul one or more convertible roadway-railway trailers, including:
   configuring the trailer for railway travel and operating the tractor to remove the trailer from a roadway and position the trailer on the railway;
   driving the tractor onto the puller and connecting the tractor to the puller drive system;
   operating the tractor to connect the puller to the trailer and drive the trailer over the railway when the trailer is positioned on the railway and configured for railway travel;
   disconnecting the tractor from the puller drive system and driving the tractor off the puller;
   configuring the trailer for roadway travel and operating the tractor to remove the trailer from the railway and position the trailer on the roadway; and
   operating the tractor to connect the tractor to a trailer and drive the trailer over the roadway when the trailer is positioned on the roadway and configured for roadway travel.

5. The method of claim 4 wherein the convertible roadway-railway trailer includes retractable roadway wheels, and configuring the trailer for railway travel and operating the tractor to remove the trailer from the roadway and position the trailer on the railway includes:
   operating the tractor while the trailer is on the roadway and the roadway wheels are extended to position the trailer over railway bogies;
   retracting the roadway wheels to lower the trailer onto the railway bogies; and
   connecting the railway bogies to the trailer.

6. The method of claim 5 wherein the convertible roadway-railway trailer includes roadway wheels slidably attached to the trailer, and operating the tractor to position the trailer over the railway bogies includes sliding the wheels from the rear of the trailer toward the front of the trailer before positioning the trailer over the roadway bogies.

7. The method of claim 6 wherein sliding the wheels toward the front of the trailer includes:
   applying the brakes to the trailer wheels; and
   operating the tractor to drive the trailer in reverse and slide the wheels toward the front of the trailer.

8. The method of claim 7 wherein sliding the wheels toward the front of the trailer further includes:

unlocking the wheels from the trailer before sliding the wheels toward the front of the trailer; and locking the wheels to the trailer after sliding the wheels toward the front of the trailer.

9. The method of claim 5 wherein configuring the trailer for railway travel and operating the tractor to remove the trailer from the roadway and position the trailer on the railway includes:

operating the tractor while the trailer is on the roadway and the railway bogies are off the railway to position the trailer over the railway bogies;

retracting the roadway wheels to lower the trailer onto the railway bogies;

connecting the railway bogies to the trailer;

extending the roadway wheels to lift the railway bogies;

operating the tractor to position the trailer and railway bogies over the railway; and retracting the roadway wheels to lower the railway bogies and trailer onto the railway.

10. The method of claim 4 wherein the convertible roadway-railway trailer includes retractable roadway wheels, and configuring the trailer for roadway travel And operating the tractor to remove the trailer from the railway and position the trailer on the roadway includes:

disconnecting the railway bogies from the trailer;

extending the roadway wheels to raise the trailer off the railway bogies; and operating the tractor while the roadway wheels are extended to position the trailer on the roadway.

11. The method of claim 10 wherein the convertible roadway-railway trailer includes roadway wheels slidably attached to the trailer, and configuring the trailer for roadway travel and operating the tractor to remove the trailer from the railway and position the trailer on the roadway includes sliding the wheels toward the rear the trailer after raising the trailer off of the railway bogies.

12. The method of claim 11 wherein sliding the wheels toward the rear of the trailer includes:

applying the brakes to the roadway wheels; and operating the tractor to drive the trailer forward and slide the wheels toward the rear of the trailer.

13. The method of claim 12 wherein sliding the wheels toward the rear of the trailer further includes:

unlocking the wheels from the trailer before sliding the wheels toward the rear of the trailer; and locking the wheels to the trailer after sliding the wheels toward the rear of the trailer.

14. The method of claim 10 wherein configuring the trailer for roadway travel and operating the tractor to remove the trailer from the railway and position the trailer on the roadway includes:

extending the roadway wheels to raise the railway bogies and trailer from the railway;

operating the tractor to remove the trailer and railway bogies from the railway and position the trailer on the roadway;

retracting the roadway wheels to lower the railway bogies;

disconnecting the railway bogies from the trailer; and extending the roadway wheels to lift the trailer off of the railway bogies.

15. The method of claim 4 wherein the puller includes a retractable ramp and driving the tractor onto and off the puller includes extending the ramp and driving the tractor onto and off the puller on the retractable ramp.

16. A method for using an over-the-roadway tractor, a puller including a platform for receiving and supporting the tractor, railway bogies including at least one driven wheel and mounted to the platform for supporting the platform for railway travel and a drive system coupled to the driven wheel and configured for interconnection to and powered by a tractor for driving the puller over a railway, and railway bogies, for hauling one or more convertible roadway-railway trailers of the type including retractable roadway wheels and a railway bogie-engaging mechanism, the method including:

configuring the trailer for railway travel and operating the tractor to remove the trailer from the roadway and position the trailer on the railway, including:

connecting the tractor to the trailer while the trailer is on the roadway and the roadway wheels are extended;

positioning the trailer over the railway bogies;

retracting the roadway wheels to lower the trailer onto the railway bogies; and connecting the railway bogies to the trailer;

driving the tractor onto the puller and connecting the tractor to the puller drive system;

operating the tractor to connect the puller to the trailer and drive the trailer over the railway when the trailer is configured for railway travel and positioned on the railway;

disconnecting the tractor from the puller drive system and driving the tractor off of the puller;

configuring the trailer for roadway travel and operating the tractor to remove the trailer from the railway and position the trailer on the roadway, including:

connecting the tractor to the trailer while the trailer is on the railway and the roadway wheels are retracted;

disconnecting the railway bogies from the trailer;

extending the roadway wheels to lift the trailer off the railway bogies; and operating the tractor to drive the trailer over the roadway when the trailer is configured for roadway travel and positioned on the roadway.

17. The method of claim 16 wherein configuring the trailer for railway travel further includes:

connecting the tractor to the trailer while the roadway wheels are extended and the railway bogies are at a storage position off the railway;

positioning the trailer over the railway bogies;

retracting the roadway wheels to lower the trailer onto the railway bogies;

connecting the railway bogies to the trailer;

extending the roadway wheels to lift the railway bogies from the storage position;

operating the tractor to position the trailer and railway bogies from bogies over the railway; and retracting the roadway wheels to lower the railway bogies and trailer onto the railway.

18. The method of claim 17 wherein configuring the trailer for roadway travel further includes:

connecting the tractor to the trailer while the trailer is on the railway and the roadway wheels are retracted;

extending the roadway wheels before disconnecting the railway bogies to lift the trailer and railway bogies off the railway;

operating the tractor to position the trailer and railway bogies at a storage position off the railway;

retracting the roadway wheels to lower the trailer and railway bogies onto the storage position;
disconnecting the railway bogies from the trailer;
extending the roadway wheels to lift the trailer off the railway bogies.

19. The method of claim 16 wherein the convertible roadway-railway trailers are of the type further including roadway wheels slidably attached to the trailers, and configuring the trailer for railway travel further includes:
unlocking the roadway wheels from the trailer;
applying the brakes to the trailer wheels;
operating the tractor to drive the trailer in reverse and slide the roadway wheels toward the front of the trailer; and
locking the roadway wheels to the trailer after the roadway wheels have been slid toward the front of the trailer.

20. The method of claim 19 wherein configuring the trailer for roadway travel further includes:
unlocking the roadway wheels from the trailer;
applying the brakes to the trailer wheels;
operating the tractor to drive the trailer forward and slide the roadway wheels toward the rear of the trailer; and
locking the roadway wheels to the trailer after the roadway wheels have been slid toward the rear of the trailer.

21. A method for using a tractor to assemble and disassemble a train of one or more convertible roadway-railway trailers having roadway tires, including:
operating the tractor while the trailer is off a railway to position the trailer near a railway bogie having railway wheels and located at a storage area off the railway;
configuring the trailer for railway travel and operating the tractor to move the trailer and the bogie and to position the trailer and the bogie on the railway; and
configuring the trailer for roadway travel and operating the tractor to remove the trailer and the bogie from the railway and to position the trailer on the roadway.

22. The method of claim 21 wherein:
configuring the trailer for railway travel and operating the tractor to move the trailer and the bogie and to position the trailer and the bogie on the railway includes:
coupling the bogie to the trailer;
operating the tractor to move the trailer and the bogie and to align them over the railway; and
engaging the railway wheels with the railway and disengaging the roadway tires from the ground; and
configuring the trailer for roadway travel and operating the tractor to remove the trailer and the bogie from the railway and to position the trailer on the roadway includes:
disengaging the railway wheels from the railway and engaging the roadway tires with the ground;
operating the tractor to remove the trailer and the bogie from the railway; and
uncoupling the bogie from the trailer.

23. The method of claim 22 wherein the roadway tires are retractable, and:
engaging the railway wheels with the railway and disengaging the roadway tires from the ground includes retracting the roadway tires; and
disengaging the railway wheels from the railway and engaging the roadway tires with the ground includes extending the roadway tires.

24. The method of claim 23 wherein:
operating the tractor to move the trailer and the bogie and to align them over the railway includes extending the roadway tires to lift the bogie off the ground;
extending the roadway tires to disengage the railway wheels from the railway and engage the roadway tires with the ground includes lifting the bogie off the railway; and
uncoupling the trailer from the bogie includes partially retracting the roadway tires to lower the bogie to the ground.

25. A method for using a tractor and bogies for hauling one or more convertible roadway-railway trailers comprising the steps of:
configuring the trailer for railway travel and operating the tractor to remove the trailer from a roadway and to position the trailer on a railway, including:
connecting the tractor to the trailer while the trailer is on the roadway;
positioning the trailer near a bogie located at a storage area off the railway;
coupling the bogie to the trailer; and
operating the tractor to move the trailer and the bogie and to align them over the railway; and
configuring the trailer for roadway travel and operating the tractor to remove the trailer from the railway and to position the trailer on the roadway, including:
connecting the tractor to the trailer while the trailer is on the railway;
operating the tractor to move the trailer and the bogie to a storage area off the railway; and
uncoupling the bogie from the trailer.

26. The method of claim 25 wherein the trailer has retractable roadway tires, and:
configuring the trailer for railway travel further includes:
extending the roadway tires to lift the bogie off the ground; and
retracting the roadway tires to lower the trailer and the bogie onto the railway; and
configuring the trailer for roadway travel further includes:
extending the roadway tires to lift the trailer and the bogie off the railway; and
partially retracting the roadway tires to lower the bogie to the ground at the storage area.

* * * * *